(12) United States Patent
Adams

(10) Patent No.: US 8,272,819 B1
(45) Date of Patent: Sep. 25, 2012

(54) RESTRAINING STRAP SECUREMENT SYSTEM

(75) Inventor: James H. Adams, Jasper, AL (US)

(73) Assignee: Fontaine Trailer Company, Inc., Jasper, AL (US)

( * ) Notice: Subject to any disclaimer, the term of this patent is extended or adjusted under 35 U.S.C. 154(b) by 152 days.

(21) Appl. No.: 12/490,064

(22) Filed: Jun. 23, 2009

(51) Int. Cl.
*B60P 7/08* (2006.01)

(52) U.S. Cl. .......... 410/97; 410/101; 410/102; 410/104; 410/106; 410/116

(58) Field of Classification Search .................. 410/96, 410/97, 100, 101, 102, 104, 106, 110, 116, 410/109, 112, 34, 115; 248/499; 24/265 CD
See application file for complete search history.

(56) References Cited

U.S. PATENT DOCUMENTS

| | | | |
|---|---|---|---|
| 3,628,467 A | 12/1971 | Stout | |
| 3,850,113 A | 11/1974 | Sichak | |
| 5,388,938 A | 2/1995 | Helton | |
| 5,416,956 A | 5/1995 | Rubin | |
| 5,674,033 A | 10/1997 | Ruegg | |
| 5,807,045 A | 9/1998 | Profit | |
| 5,860,777 A | 1/1999 | Walsh et al. | |
| 6,168,360 B1 | 1/2001 | Knox | |
| 6,250,861 B1 | 6/2001 | Whitehead | |
| 6,256,844 B1 * | 7/2001 | Wheatley | |
| 6,375,242 B1 | 4/2002 | Zingerman | |
| 6,626,621 B1 | 9/2003 | Hugg | |
| 6,626,623 B2 * | 9/2003 | DeLay | 410/116 |
| 6,783,312 B2 | 8/2004 | Smith | |
| 7,051,410 B2 | 5/2006 | Simond | |
| 7,056,073 B2 | 6/2006 | Ardo | |
| 7,160,069 B2 | 1/2007 | Adams | |
| 7,416,167 B1 | 8/2008 | Knox | |
| 2007/0110537 A1 | 5/2007 | Adams | |

FOREIGN PATENT DOCUMENTS

EP 1108608 6/2001

OTHER PUBLICATIONS

International Search Report and Written Opinion issued in corresponding International Application No. PCT/US2010/039515 issued Sep. 7, 2010.

* cited by examiner

*Primary Examiner* — Stephen Gordon
(74) *Attorney, Agent, or Firm* — R. Blake Johnston, Esq.; DLA Piper US LLP

(57) ABSTRACT

A restraining strap securement system for a trailer includes a load-restraining strap with a flat hook that connects to the trailer side rail. The trailer side rail extends along the sides of the trailer and comprises a bottom wall with an opening for receiving the flat hook. A keeper slides upon a rail affixed to the bottom wall and the keeper may be positioned to extend beneath the flat hook and prevent the flat hook from falling from the opening while the strap is being tightened. The keeper may comprise a hook that can be used to secure tarps or ropes over the trailer load.

7 Claims, 4 Drawing Sheets

Section A-A

Section A-A

Detail B

RESTRAINING STRAP SECUREMENT SYSTEM

FIELD OF THE INVENTION

The present invention is related to a trailer, and more specifically, to a load securement system of a flatbed trailer.

BACKGROUND AND SUMMARY OF THE INVENTION

A trailer, such as a flatbed trailer, has a load securement system comprising load restraining straps that attach to the trailer. A restraining strap securement system for a trailer includes a load-restraining strap with a flat hook that connects to the trailer side rail. The trailer side rail extends along the sides of the trailer and comprises a bottom wall with an opening for receiving the flat hook. A keeper slides upon a rail affixed to the bottom wall and the keeper may be positioned to extend beneath the flat hook and prevent the flat hook from falling from the opening while the strap is being tightened. The keeper may comprise a hook that can be used to secure tarps or ropes over the trailer load.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
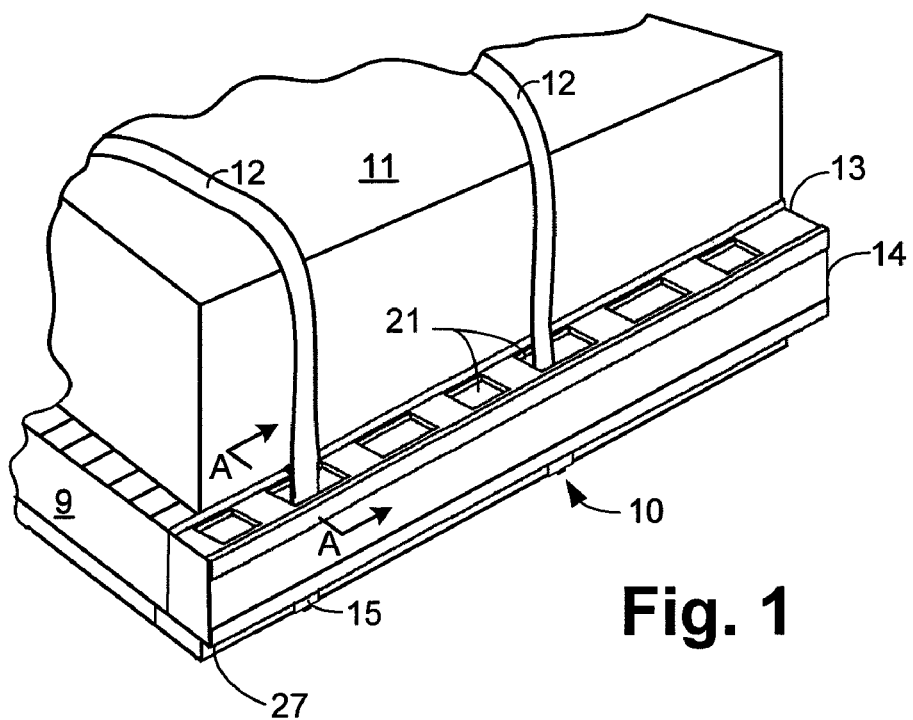
FIG. 1 depicts a partial perspective view of a trailer securing a load in accordance with an embodiment of the present disclosure.

FIG. 1 is a partial view of one embodiment of a strap securement system 10 that secures a load 11 disposed on a flatbed trailer 9 according to the present disclosure. The system 10 comprises at least one strap 12 which secures the load 11 to the trailer 9. The trailer 9 comprises a side rail 13 which extends along both longitudinal sides of the trailer 9. The side rail 13 comprises a rub rail 14 which protects the trailer 9 and the load 11 from damage should the trailer 9 be impacted by an object (not shown). The side rail 13 further comprises a plurality of openings 21. The openings 21 receive the at least one strap 12 and protect the strap from damage or severing if the strap impacts an object. The strap 12 is secured to the lower side rail wall 27 via a flat hook 15, which is illustrated with further reference to FIG. 2.

Figure 2:
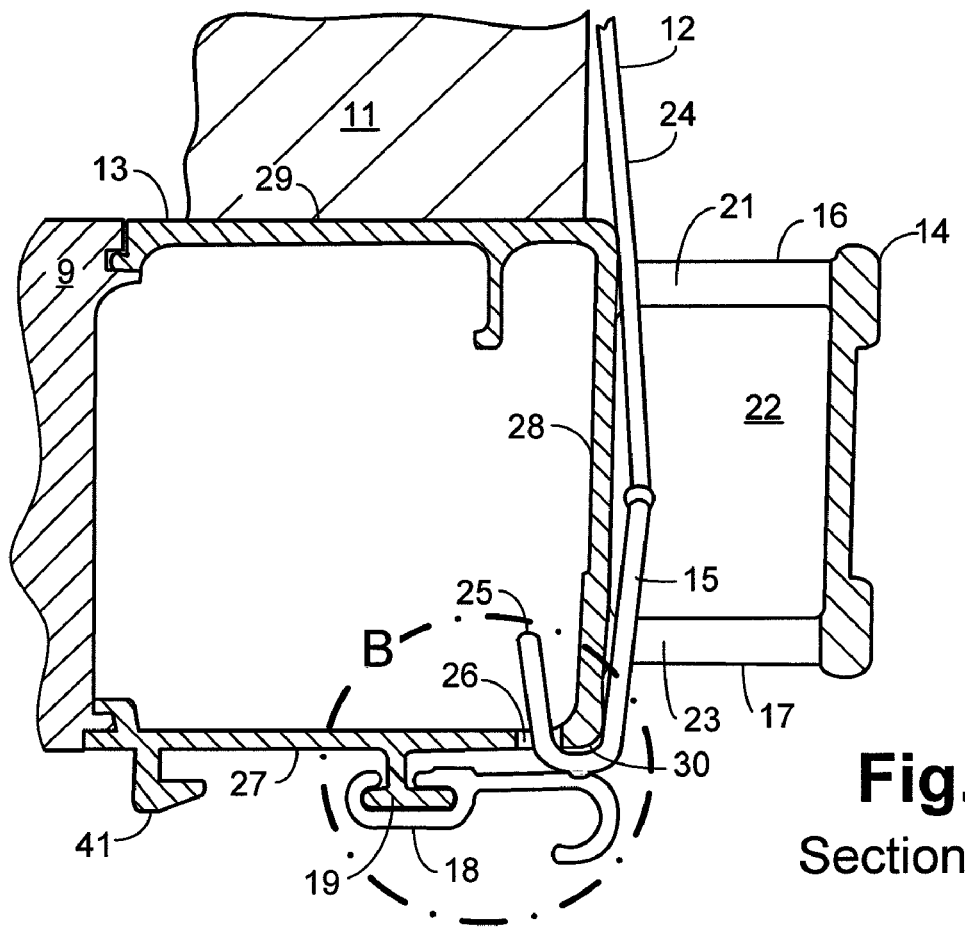
FIG. 2 is a sectional view of a side rail of the trailer of FIG. 1 showing a load secured to the trailer, taken along sectional lines A-A of FIG. 1.

FIG. 2 is a cross sectional view of the side rail 13 taken along section lines "A-A" of FIG. 1. The side rail 13 comprises a generally horizontal floor section 29 and an outer side rail wall 28 that extends downward from the floor section 29. The outer side rail wall 28 extends along the entire length of the trailer 9. The floor section 29 is coextensive with the outer side rail wall 28, and the outer side rail wall 28 extends generally perpendicular to the floor section 29.

Upper and lower connector walls 16 and 17 fix the rub rail 14 to the outer side rail wall 28. In this embodiment, the rub rail 14 is generally parallel to the outer side rail wall 28 and generally perpendicular to the upper and lower connector walls 16 and 17. The upper and lower connector walls 16 and 17 support the rub rail 14 spaced apart from the outer side rail wall 28 and create a substantially rectangular open space 22 that extends down the length of the side rail 13.

The upper and lower connector walls 16 and 17 extend generally parallel to each other. The upper wall 16 comprises a plurality of upper openings 21 and the lower wall 17 comprises a plurality of lower openings 23 that are generally aligned with the openings 21 in the upper wall 16. The strap 12 can thus pass through the upper opening 21 and the lower opening 23 in a generally straight line. The strap 12 comprises a flexible portion 24 which may conform to and secure the load 11 (FIG. 1).

The lower side rail wall 27 extends generally perpendicularly from the outer side rail wall 28, forming a corner 30 where the outer side rail wall 28 meets the lower side rail wall 27. A hook opening 26 is formed in the lower side rail wall near the corner 30. The hook opening 26 is sized and shaped to receive and retain a flat hook 15 that is disposed on a free end of the strap 12. The flat hook 15 comprises a free end 25 that is received by the hook opening 26. In order to secure a load 11, a user (not shown) may pass the flat hook 15 through the openings 21 and 23 and then hook it over the corner 30 such that the free end 25 is within the hook opening 26. There must necessarily be slack in the flexible portion 24 of the strap 12 in order for this to be accomplished. The user then tightens the strap 12 by using a strap winch (not shown).

A keeper 18 restrains the flat hook 15 in position within the opening 26. The keeper 18 is slideably connected to a bottom rail 19 disposed on the lower side rail wall 27 of the side rail 13. After the flat hook 15 is in place, the keeper 18 may be slid along the rail 19 until it contacts the flat hook 15 to hold the flat hook 15 in place while the strap 12 is being tightened.

In some embodiments, an L-shaped track 41 is disposed on the lower side rail wall 27 and is substantially parallel to the bottom rail 19. The L-shaped track 41 and the bottom rail 19 may be used together to support a strap winch (not shown) that may be supported by a "Double-L track" that is known in the art. In other words, the bottom rail 19 may serve as the second "L" in a "Double-L track" pair that may support a strap winch.

Figure 3:
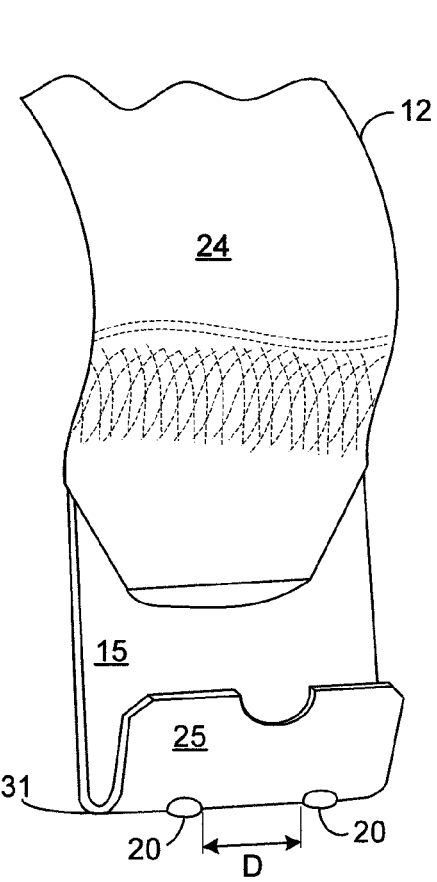
FIG. 3 depicts a perspective view of a flat hook used to secure the load.

FIG. 3 depicts an embodiment of the strap 12 which comprises the flat hook 15 and the flexible portion 24. Two protrusions 20 are disposed on the bottom exterior surface 31 of the flat hook 15. The protrusions 20 maintain the keeper 18 in proper position in contact with the flat hook 15, as further shown in FIG. 4.

Figure 4:
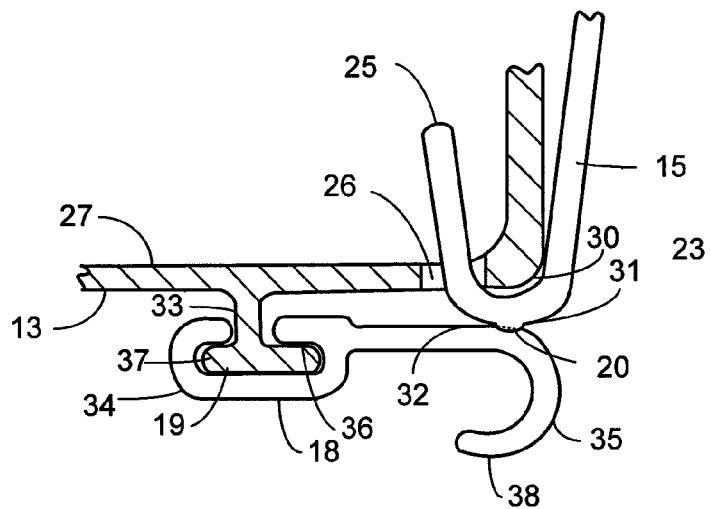
FIG. 4 depicts an enlarged detail view of the side rail portion shown in FIG. 2, taken along detail view "B" of FIG. 2 showing a keeper hook.

FIG. 4 (Detail B from FIG. 2) is an enlarged cross-sectional view of the side rail 13 depicting the keeper 18 restraining the flat hook 15. The bottom rail 19 is affixed to the side rail 13 by a standoff 33. The bottom rail 19 and the standoff 33 form a shape similar to an inverted letter "T." In the illustrated embodiment, the outermost leg 36 of the rail 19 is longer than the innermost leg 37 of the rail 19. The bottom rail 19 extends down the length of the trailer (not shown). In other embodiments, the bottom rail 19 may be in a different configuration, provided that the keeper 18 may be slideably coupled to the bottom rail 19.

In this embodiment the keeper 18 comprises a generally C-shaped portion 34 and a generally J-shaped portion 35. The C-shaped portion 34 slideably mates with the bottom rail 19. The J-shaped portion 35 extends from the C-shaped portion 34 and has an inwardly-extending hook 38. The hook may be used to secure tarps (not shown) or ropes that are covering a load.

An outer keeper surface 32 of the J-shaped portion 35 contacts the bottom exterior surface 31 of the flat hook 15. In other embodiments of the invention, the keeper 18 may be comprised of the C-shaped portion 34 that slideably mates with the bottom rail 19 and an extending flat-hook-contacting portion (not shown), and may not have a J-shaped portion 35. Further, shapes other than a C-shape may be used to slideably secure the keeper 18 to the rail 35.

The keeper 18, which may slide along the rail 19 unless restrained, is kept in place between the two protrusions 20 of the flat hook 15. Thus the keeper 18 keeps the flat hook 15 in position (i.e., keeps it from falling out of the opening 26) and the protrusions 20 on the flat hook 15 in turn maintain the keeper 18 in position along the rail 19. The width "W" (FIG. 5) of the outer keeper surface 32 of the keeper 18 must therefore be less than the distance "D" (FIG. 3) between the two protrusions 20 in order for the outer keeper surface 32 of the keeper 18 to fit in between the protrusions 20 and be restrained by them. This relationship is discussed further below with respect to FIG. 6.

Figure 5:
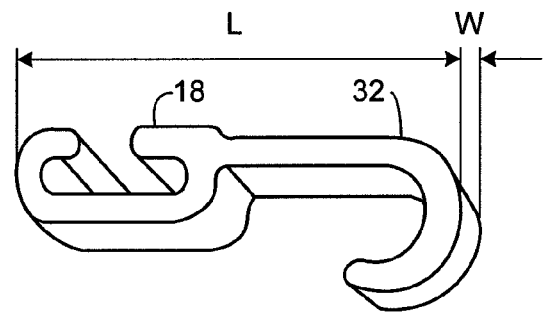
FIG. 5 depicts a perspective view of the keeper hook as shown in FIG. 4.

FIG. 5 further illustrates the keeper 18. In this embodiment, the keeper 18 has width "W" and a length "L." The length "L" must be sufficient for the outer keeper surface 32 to contact the flat hook 15 (FIG. 4) when the keeper 18 is slideably positioned beneath the flat hook 15.

Figure 6:
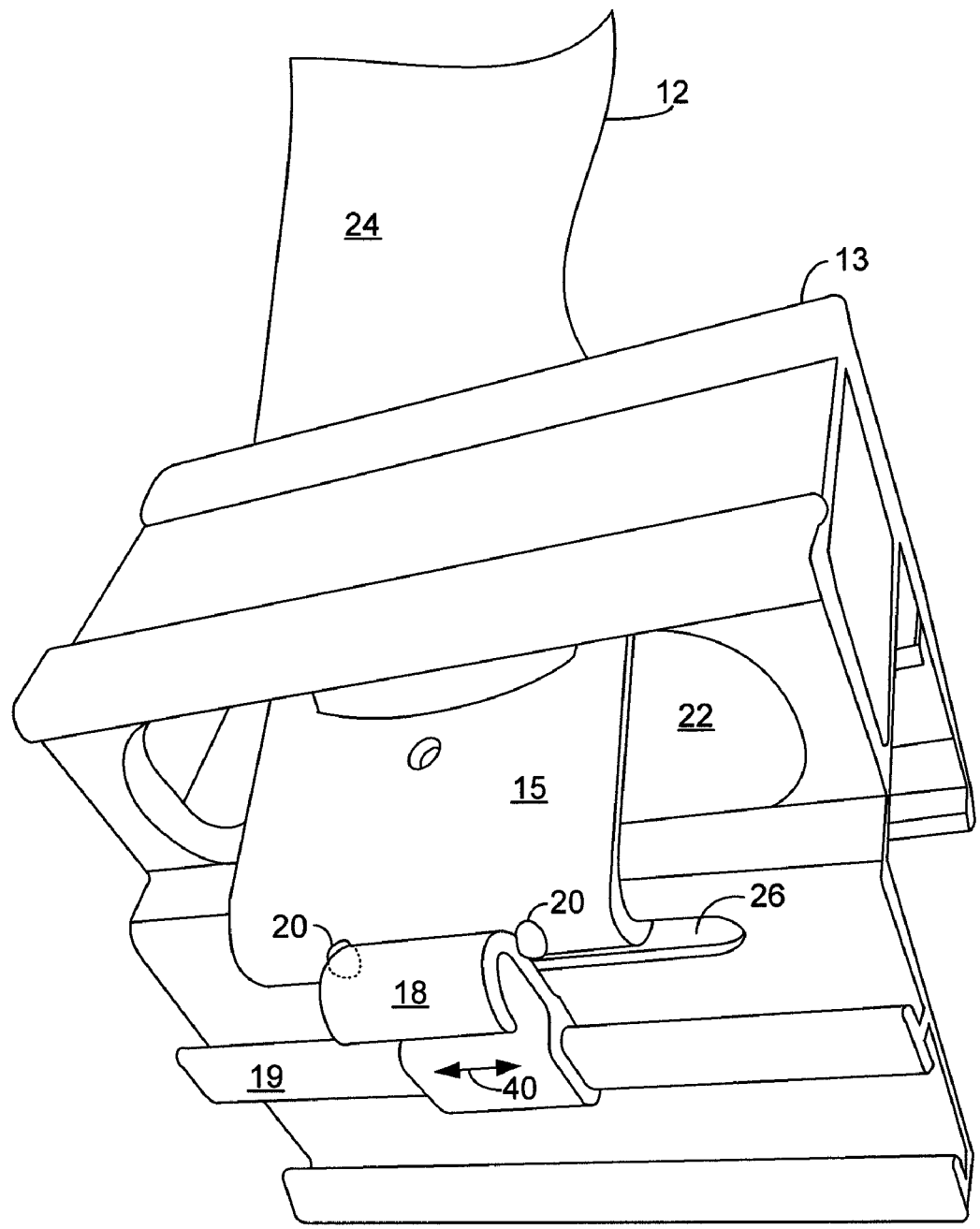
FIG. 6 depicts a partial bottom perspective view of the side rail shown in FIG. 2.

FIG. 6 is a bottom perspective view of a segment of the side rail 13 with the keeper 18 restraining the flat hook 15. The keeper 18 may slide on the bottom rail 19 in the direction as indicated by direction arrow 40, i.e., longitudinally along the side rail 13.

In operation, the user (not shown) feeds the flat hook 15 through the openings 21 (FIG. 2) and 23 (FIG. 2) and then hooks the flat hook 15 into the opening 26 on the lower side rail wall 27 of the side rail 13. The user then slides the keeper 18 along the bottom rail 19, and over one of the protrusions 20 until the keeper is frictionally held between the two protrusions 20. There is sufficient clearance between the outer keeper surface 32 (FIG. 4) and the flat hook 15 (when the flat hook is held tightly against the corner 30 (FIG. 4), for example) for the keeper 18 to slide over one of the protrusions 20 and then be held in place between the two protrusions 20.

Figure 7:
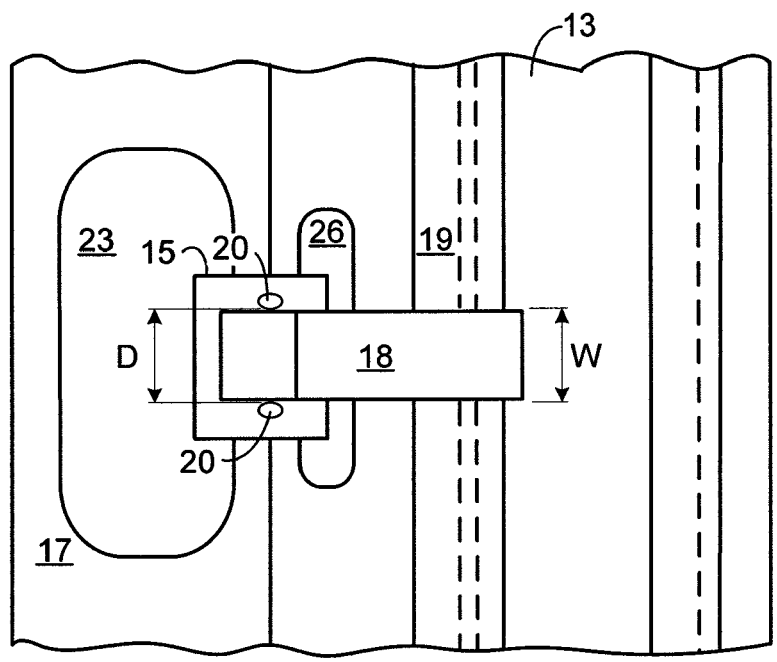
FIG. 7 depicts a partial bottom view of the side rail shown in FIG. 6.

FIG. 7 is a partial bottom view of the side rail 13 showing the keeper 18 restrained between the protrusions 20 on the flat hook 15. As discussed above, the width W of the keeper 18 must be less than the distance D between the two protrusions 20 in order for the keeper 18 to fit between the two protrusions 20.

Figure 8:
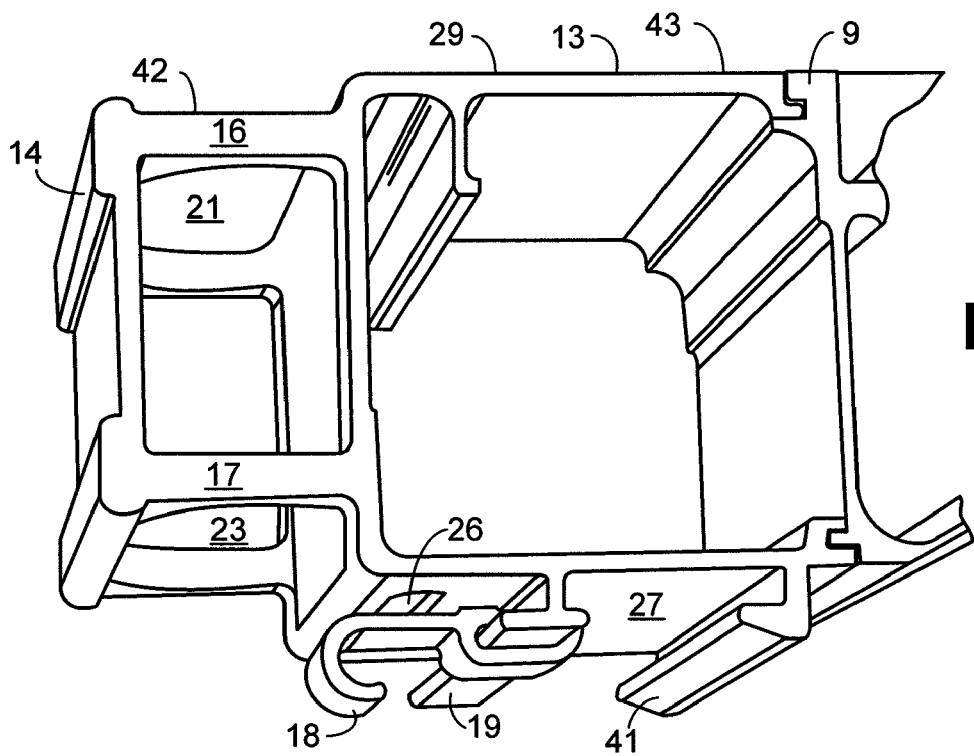
FIG. 8 is a side perspective view of the side rail portion shown in FIG. 2, without the strap and flat hook.

FIG. 8 depicts a partial side perspective view of the side rail 13 shown without a strap 12 (FIG. 2) or flat hook 15 (FIG. 2). In this embodiment, the top surface 42 of the upper connector wall 16 is lower than the top surface 43 of the floor section 29. Further, the corner 44 between the floor section 29 and the outer side rail wall 28 is smooth and rounded to provide a smooth surface for the strap 12 (FIG. 2) to rest against.

Although the keeper 18 is illustrated herein as restraining the flat hook 15, in other embodiments the keeper 18 is used without the flat hook 15. In such embodiments, the keeper may be used to tie off a load (not shown).

This invention may be provided in other specific forms and embodiments without departing from the essential characteristics as described herein. The embodiment described is to be considered in all aspects as illustrative only and not restrictive in any manner.

As described above and shown in the associated drawings and exhibits, the present invention comprises a trailer load securement system. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A restraining strap securement system for a trailer, comprising:
   a load restraining strap comprising a flexible strap with a free end and a flat hook disposed on the free end;
   a trailer side rail extending along a side of a trailer, the side rail comprising a bottom wall with an opening for receiving the flat hook;
   a bottom rail affixed to the bottom wall and extending along a bottom of the side rail;
   a keeper slideably connected to the bottom rail, the keeper engaging the flat hook and preventing the flat hook from falling from the opening.

2. The system of claim 1, wherein the keeper comprises a substantially C-shaped portion that is slideably connected to the bottom rail.

3. The system of claim 2 wherein the keeper further comprises a substantially J-shaped portion extending from the substantially C-shaped portion.

4. The system of claim 3, wherein the flat hook comprises two protrusions.

5. The system of claim 4, wherein the two protrusions are affixed at a distance slightly larger than a width of the substantially J-shaped portion of the keeper.

6. The system of claim 5, wherein the substantially J-shaped portion of the keeper is disposed between the two protrusions when the flat hook engages the opening.

7. A restraining strap securement system for a trailer, a restraining strap having an end to which is attached a flat hook, the system comprising:
   a trailer side rail extending along a side of a trailer, the side rail comprising a bottom wall, the bottom wall having an opening for receiving a flat hook of a restraining strap;
   a bottom rail affixed to the bottom wall and extending along a bottom of the side rail; and a keeper slideably connected to the bottom rail, the keeper comprising
   a substantially C-shaped portion configured to slideably engage the bottom rail; and
   a substantially J-shaped portion extending from the substantially C-shaped portion; and wherein the J-shaped portion of the keeper engages the flat hook and prevents the flat hook from disengaging from the opening.

* * * * *